(12) United States Patent
Morling et al.

(10) Patent No.: US 7,359,132 B2
(45) Date of Patent: *Apr. 15, 2008

(54) EQUALIZATION PREAMBLE REGION IN DIGITAL DATA STORAGE (DDS) FORMAT

(75) Inventors: Robert Philip Morling, Bristol (GB); Andrew Hana, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 657 days.

This patent is subject to a terminal disclaimer.

(21) Appl. No.: 10/754,617

(22) Filed: Jan. 12, 2004

(65) Prior Publication Data

US 2004/0141247 A1     Jul. 22, 2004

Related U.S. Application Data

(63) Continuation-in-part of application No. 09/826,810, filed on Apr. 6, 2001, now Pat. No. 6,678,104.

(30) Foreign Application Priority Data

Apr. 10, 2000   (EP)   ................................. 00303019

(51) Int. Cl.
G11B 20/14  (2006.01)
G11B 5/09   (2006.01)
G11B 5/58   (2006.01)

(52) U.S. Cl. ............................. 360/40; 360/48; 360/65

(58) Field of Classification Search .................... None
See application file for complete search history.

(56) References Cited

U.S. PATENT DOCUMENTS

| | | | |
|---|---|---|---|
| 3,789,377 A | 1/1974 | Norris | |
| 5,349,611 A | 9/1994 | Varian | |
| 5,588,030 A * | 12/1996 | Riggle et al. | ............... 375/368 |
| 5,841,601 A | 11/1998 | Fisher | |
| 6,476,992 B1 * | 11/2002 | Shimatani | .................... 360/46 |

FOREIGN PATENT DOCUMENTS

| | | |
|---|---|---|
| EP | 831 480 | 3/1998 |
| JP | 2 177 062 | 7/1990 |

* cited by examiner

*Primary Examiner*—William R. Korzuch
*Assistant Examiner*—Jason Olson (57) ABSTRACT

A magnetic tape includes plural diagonal tracks, each storing a preamble sequence close to user data such that a transducer for reading the track reads the preamble sequence immediately before reading the user data. The preamble sequence is such that when the track is read by the transducer the preamble sequence has a power sequence with a power spectrum substantially equivalent to the power spectrum of the user data. An AGC circuit responds to the transducer.

38 Claims, 11 Drawing Sheets

EQUALIZATION PREAMBLE REGION IN DIGITAL DATA STORAGE (DDS) FORMAT

RELATION TO CO-PENDING APPLICATION

The present application is a continuation-in-part of the commonly assigned application Ser. No. 09/826,810, filed Apr. 6, 2001 now U.S. Pat. No. 6,678,104, of which we are the co-inventors.

FIELD OF INVENTION

The present invention relates to the field of data storage devices, and particularly, although not exclusively, to the field of digital data storage systems having a data storage medium which moves relative to a read/write head.

BACKGROUND TO THE INVENTION

It is known to provide reliable storage and retrieval of digital data, particularly computer data, by means of a digital data storage (DDS) format defined in ISO/IEC standard 10777:1991E. DDS format devices have developed through versions DDS-1 to DDS-4, which are known in the prior art.

In a DDS device, an elongated band of magnetic tape contained upon a pair of spools in a data storage cassette is transported past one or more rotating electro-magnetic read and write heads, such that the heads trace a path which is substantially diagonal across a main length of the elongated magnetic tape. Multiple passes of the write heads result in multiple diagonal tracks across the magnetic tape, which extend along the length of the magnetic tape.

Figure 1:
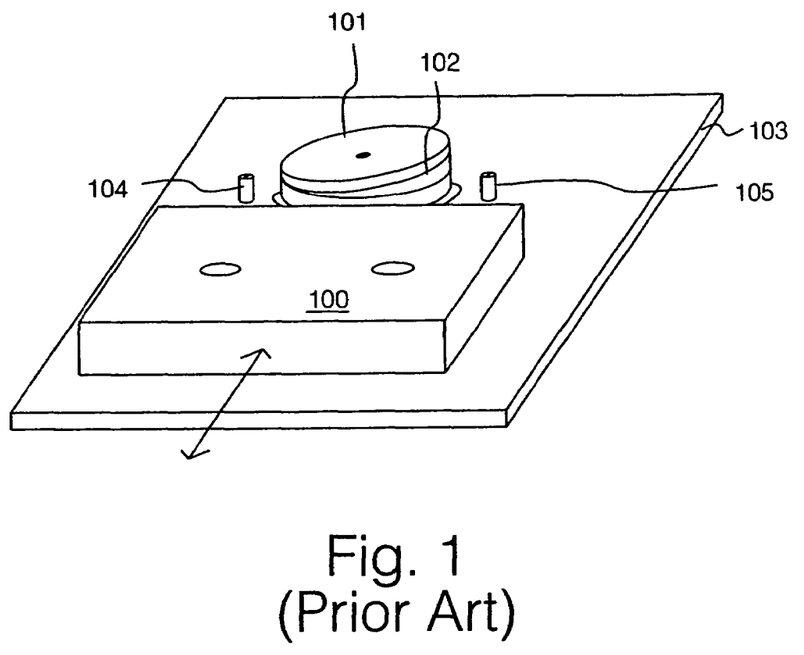
FIG. 1, as described, is an illustration of a physical mechanism of a prior art DDS data storage device comprising a magnetic tape data storage medium contained within a removable cassette, read by a rotating read/write head.

Referring to FIG. 1 herein, there is shown schematically a layout of a tape data storage cartridge in relation to a tape drive mechanism according to the DDS format, in which an elongated band of tape is contained within a removable tape cartridge 100. The tape cartridge is inserted into the tape drive mechanism. A rotating read/write head 101 comprises first and second read heads and first and second write heads situated at substantially equidistant points around a circumference of the rotating head. The head rotates on top of a substantially cylindrical metallic plinth 102. The read/write head rotates at a speed of approximately 11,400 revolutions per minute. A main central axis of a cylinder formed by the outer surfaces of the drum and the plinth is directed offset from a line normal to a plane of a base plate 103, so that the effect is that as the band of tape traverses around part of the circumference of the cylindrical head plinth, the rotating heads describe a path diagonally across the width of the tape in successive passes of the heads past the tape.

Figure 2:
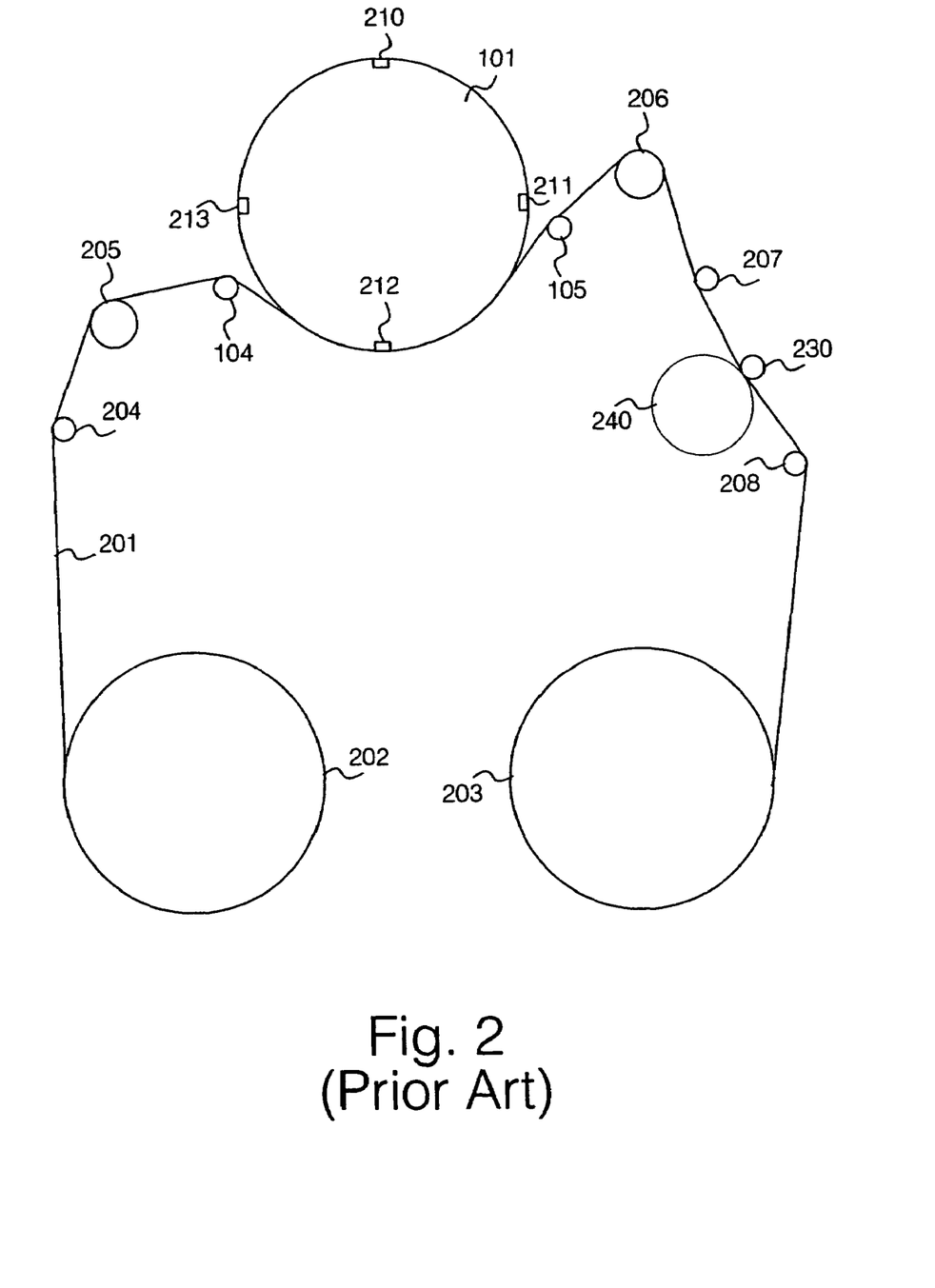
FIG. 2, as described, is a schematic illustration of the path of a magnetic tape data storage medium with respect to a rotating drum containing a plurality of read heads and a plurality of write heads according to the prior art DDS format.

Referring to FIG. 2 herein there is shown schematically a tape path of the elongated magnetic tape data storage medium 201 as it is drawn past the rotating drum containing the read and write heads. The tape data storage medium 201 is wound onto a feed reel 202 and a take up reel 203 which are within the removable tape cartridge 100. During normal operation, the magnetic tape 201 is wound from the feed-reel 202 onto the take-up reel 203. The path of the magnetic tape 201 is constrained by a plurality of rollers and tape guides 204-208. Additional tape guides 104,105 determine the relative positions of the rotating drum 102, the read and write heads 210-213 and the tape data storage medium 201. The feed reel 202 and take up reel 203 are driven by electric motors to maintain a correct tension in the magnetic tape 201 past the head.

Figure 3:
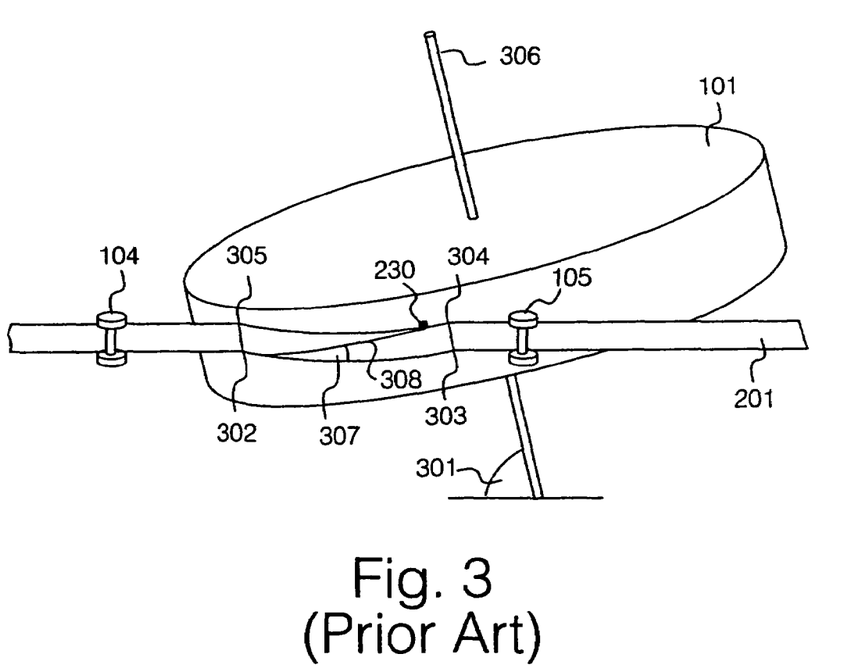
FIG. 3, as described, is a schematic illustration of rotation of the drum containing a plurality of read/write heads with respect to an elongated band of magnetic tape drawn in an arcuate path around the rotating drum.

Referring to FIG. 3 herein, there is illustrated schematically the orientation of the magnetic tape 201 with respect to the rotating drum 101. The tape 201 is drawn past the rotating head at a relatively slow tape speed of the order of a few centimeters per second. However, the rotating drum 101 on which the read and write heads are mounted typically rotates at a few thousand revolutions per minute, so the relative speed of the read and write heads to the drum is order of magnitudes greater than the absolute tape speed. During a write operation, the write heads record a sequence of tracks diagonally across the elongated magnetic tape 201. The width of such tracks is typically of the order of 6.8 µm.

Figure 4:
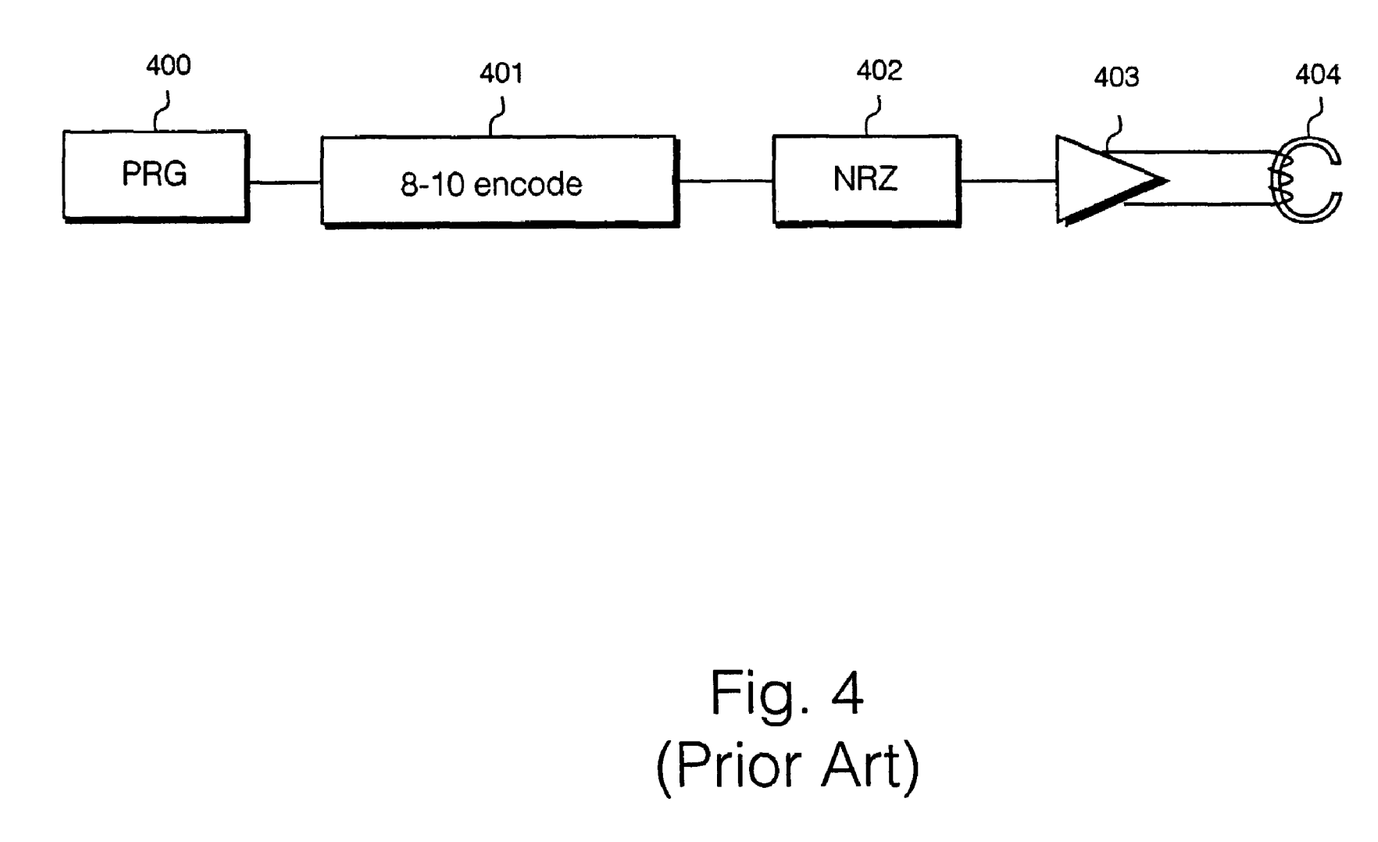
FIG. 4, as described, is a schematic illustration of a write signal channel for writing data to a magnetic tape according to the known DDS format.

Referring to FIG. 4 herein, there is illustrated schematically a portion of a write circuit for writing a logical track according to the specific implementation of the present invention. The write circuit contains a linear feedback shift register 400 for generating a pseudo random bit sequence as described herein for incorporation into a preamble field of the logical data track; an 8-10 encoder 401; a non-return to zero circuit 402, an output amplifier 403, and a write head 404.

Figure 5:
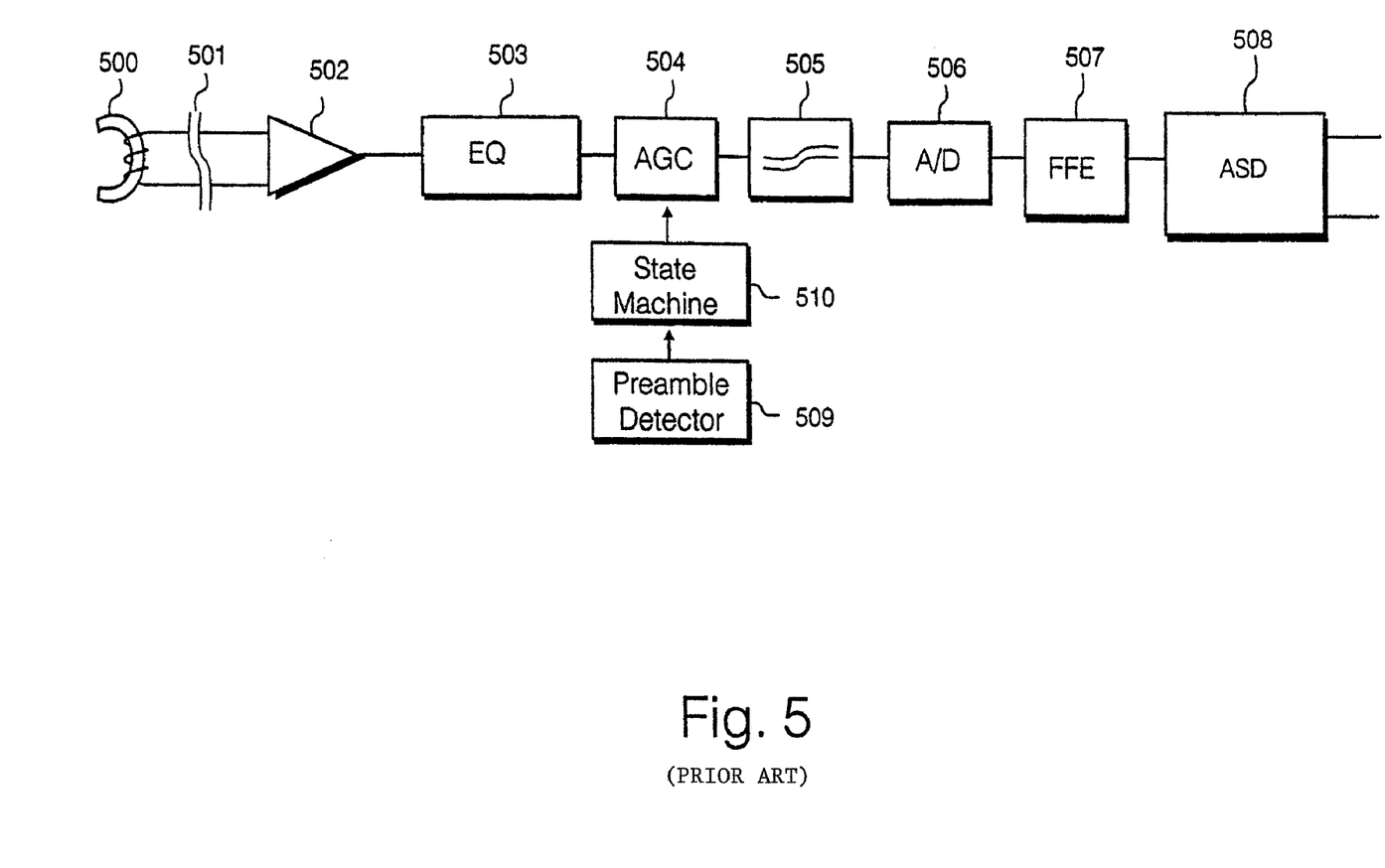
FIG. 5, as described, is a schematic illustration of a read channel for reading data from a magnetic tape according to the known DDS format.

Referring to FIG. 5 herein, there is shown schematically a read channel for reading data from a data storage medium of cartridge 100. The read channel comprises a read head 500. Data stored on the tape is read by the read head 500 which passes the signal via a rotary transformer 501 to an amplifier 502. Amplifier 502 sends an amplified output signal which is supplied to an equalizer 503 for the purpose of initial equalization. After equalization, the signal is passed to an automatic gain control circuit 504, and is filtered in a filter 505 which further shapes an overall channel frequency response to match a required equalization characteristic. The filtered signal is supplied to an analog to digital converter 506 which produces a digitized version of the filtered signal, which is then passed to a feed forward equalizer 507 which further equalizes the signal to a required equalization target. An equalized digital signal output from the feed forward equalizer 507 is supplied to a sequence detector 508. The sequence detector 508 includes a Viterbi engine, and various detection paths for determining a sequence of bits resulting from the signal read by the read head 500. The read channel also includes a preamble detector 509 for detecting preamble data before reading user data, the preamble detector producing an output which is supplied to a state machine 510. The output of the state machine controls automatic gain control circuit 504 to adjust a gain in the read channel.

Figure 6:
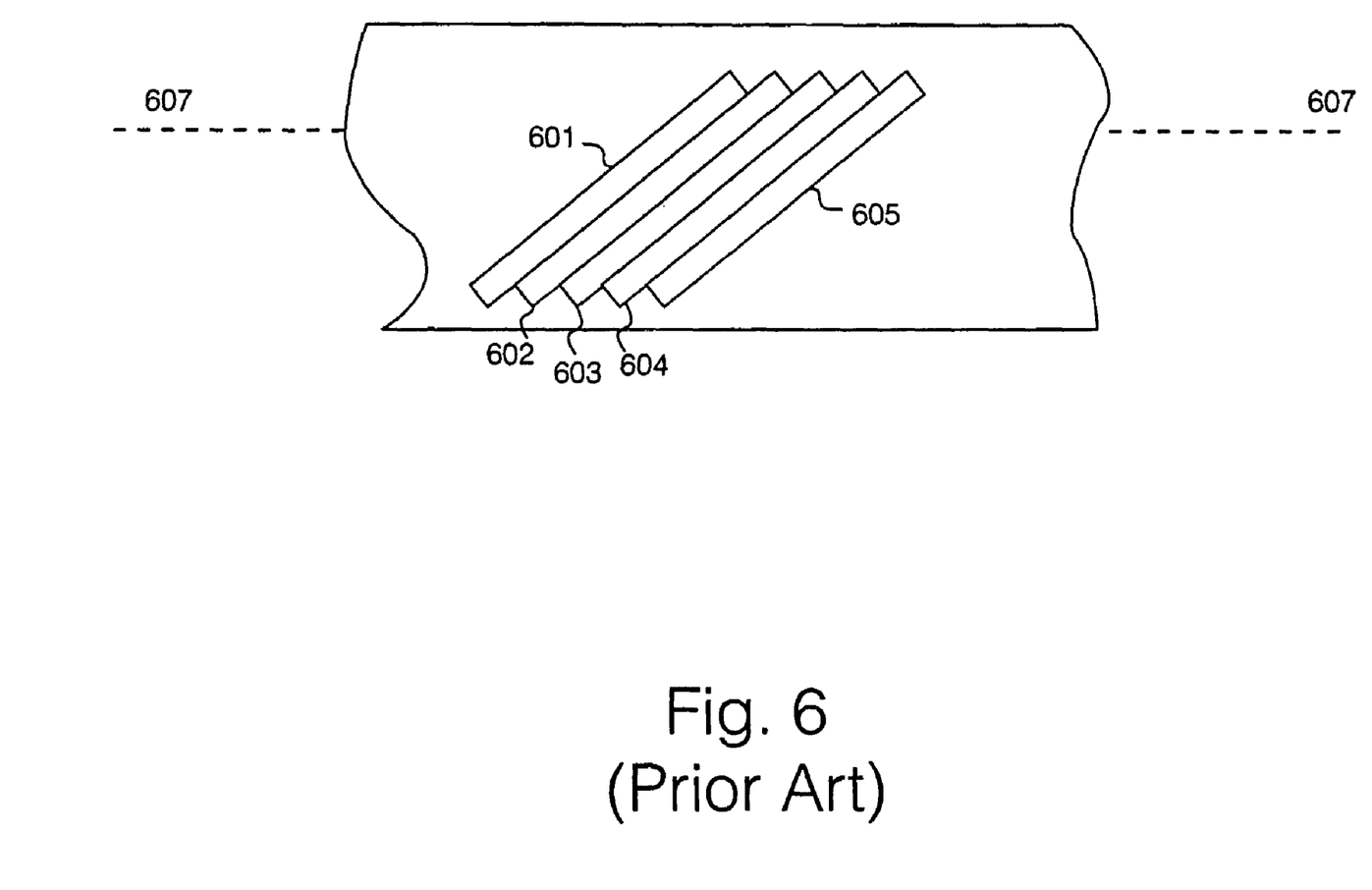
FIG. 6, as described, is a schematic illustration of a physical layout of data tracks written on an elongated magnetic band data storage medium according to the known DDS format.

Referring to FIG. 6 herein, there is illustrated schematically a layout of physical tracks striped across the width of an elongated magnetic band tape in a cartridge. A plurality of tracks are written slightly overlaying each other by successive passes of the write head of a rotating drum.

Figure 7:
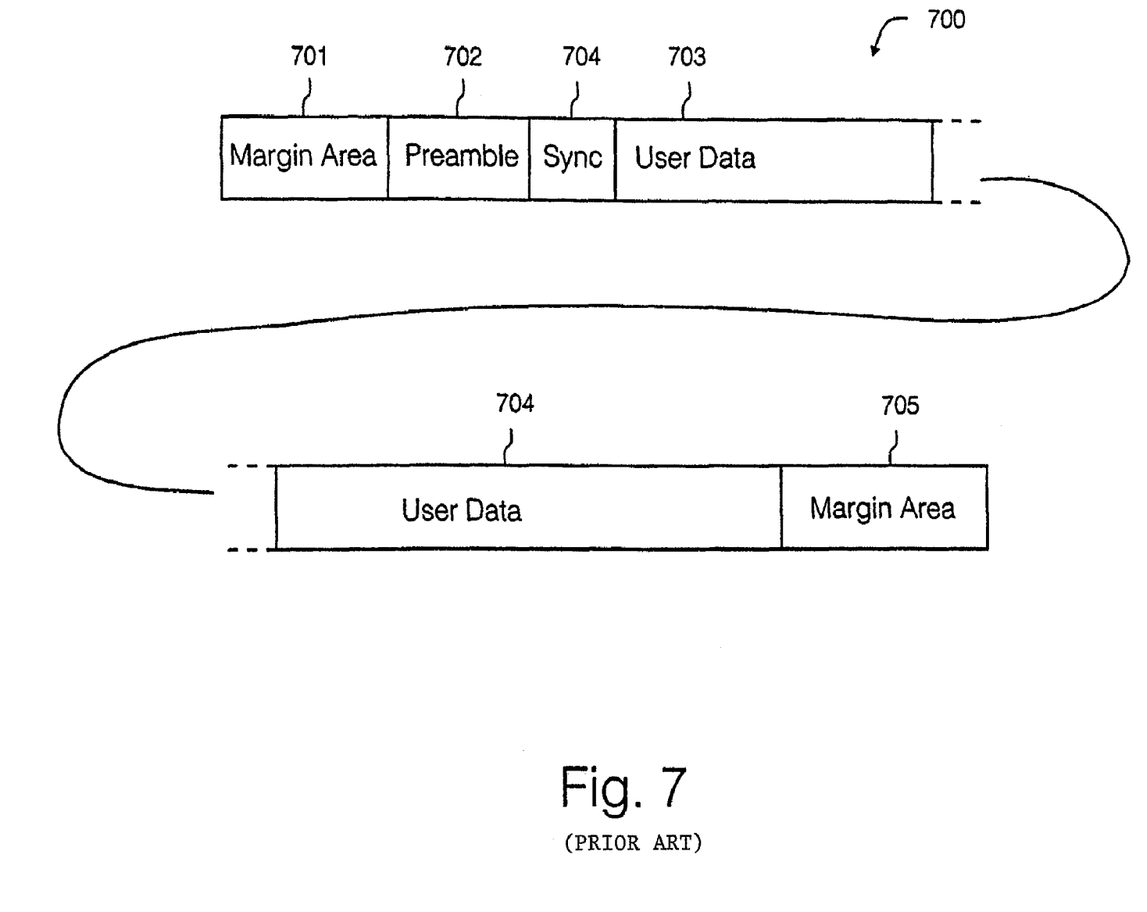
FIG. 7, as described, is a schematic illustration of a logical layout of data written along one diagonally written physical track across the elongate magnetic band in accordance with the known DDS format.

Referring to FIG. 7 herein, there is illustrated schematically a logical data layout of a single track written across the tape data storage medium in a single pass of a write head across the width of the tape. The logical track 700 comprises in sequence a first margin area 701 which when written physically resides at one edge of the tape data storage medium; a preamble region 702; a user data region 703 that is close to region 702, and preceded by a synchronization header 704; and a second margin area 705 written after the user data 703, the second margin area laying physically at a second edge of the tape data storage medium. The preamble region 702 is positioned between the first margin area 701 and the user data 703 so region 702 immediately precedes the user data 703. The preamble region acquires gain and timing information prior to reading the user data 703 with the object of achieving an optimum bit error rate while reading the user data area 703. Because the head reads preamble region 702 immediately before user data region 703, an AGC circuit driven by the head does not change gain substantially when there is a transition from region 702 to region 703.

The prior art preamble field contains a 2T tone data. However, as the density of bits stored on tape increases, the 2T tone data preamble field gives rise to a problem of fluctuation of gain control in the automatic gain control circuit 504 which causes problems for reading higher bit densities.

In the prior art DDS-4 format, the preamble region 702 usually consists of a single frequency constant tone bit sequence which immediately precedes the user data 703. The DDS-4 logical format calls for a constant 2T tone in the preamble region. The parameter T relates to the minimum acceptable spacing between pulse transitions. In the DDS-4 format the preamble region 702 consists of 640 bits of data. The bits of data are arranged in transitions of 2T length, that is to say 4 bits per cycle. This gives a preamble region length of 160 cycles (640T), each cycle being +,+,−,−. The physical distance occupied by a cycle on the tape data storage medium depends on the data storage density of bits on the tape. The overall physical length of preamble field as recorded on the tape in the DDS-4 format is approximately 107 μm.

According to one aspect of the co-pending application there is provided a method of encoding a plurality of tracks of data for storage on a tape data storage medium. The method comprises for each of said plurality of data tracks written to said tape data storage medium, writing within said data track, a preamble region which precedes a user data region, said preamble region having a preamble data sequence having a power spectrum substantially similar to a power spectrum of a substantially random data. Preferably said preamble data sequence of the co-pending application has a power spectrum characteristic prior to any subsequent encoding which may occur has a power spectrum resulting from the following byte stream of hexadecimal coded numbers b3, d2, b8, 83, 67, a5, 71, 06, cf, 4a, e2, 0d, 9e, 95, c4, 1b, 3d, 2b, 88, 36, 7a, 57, 10, 6c, f4, ae, 20, d9, e9, 5c, 41, b3, d2, b8, 83, 67, a5, 71, 06, cf, 4a, e2, 0d, 9e, 95, c4, 1b, 3d, 2b, 88, 36, 7a, 57, 10, 6c, f4, ae, 20, d9, e9, 5c, 41, b3, d2, b8, 83, 67, a5, 71, 06, cf, 4a, e2, 0d, 9se, 95, c4, 1b, 3d, 2b, 88, 36, 7a, 57.

According to another aspect of the co-pending application there is provided an apparatus for encoding a plurality of tracks of data for storage on a tape data storage medium, said apparatus comprising:

a write circuit for writing said plurality of data tracks to a tape data storage medium, said write circuit being arranged for writing on said data track, a preamble region which precedes a user data region, said preamble region having a preamble data sequence having a power spectrum substantially similar to a power spectrum of a substantially random data.

In the co-pending application the apparatus writes a preamble data sequence having a power spectrum characteristic resulting from the following byte stream of hexadecimal numbers:

b3, d2, b8, 83, 67, a5, 71, 06, cf, 4a, e2, 0d, 9e, 95, c4, 1b, 3d, 2b, 88, 36, 7a, 57, 10, 6c, f4, ae, 20, d9, e9, 5c, 41, b3, d2, b8, 83, 67, a5, 71, 06, cf, 4a, e2, 0d, 9e, 95, c4, 1b, 3d, 2b, 88, 36, 7a, 57, 10, 6c, f4, ae, 20, d9, e9, 5c, 41, b3, d2, b8, 83, 67, a5, 71, 06, cf, 4a, e2, 0d, 9e, 95, c4, 1b, 3d, 2b, 88, 36, 7a, 57.

SUMMARY OF THE INVENTION

One aspect of the invention relates to a data storage medium comprising a track storing a preamble sequence close to user data such that a transducer for reading the track reads the preamble sequence immediately before reading the user data. The preamble sequence is such that when the track is read by the transducer the preamble sequence has a power sequence with a power spectrum substantially equivalent to the power spectrum of the user data.

The storage medium is preferably magnetic, and is particularly a magnetic tape including plural diagonal tracks.

The data storage medium is typically in combination a transducer for driving an automatic gain control circuit.

In one embodiment, the preamble sequence is a byte stream of hexadecimal coded numbers in accordance with:

b3, d2, b8, 83, 67, a5, 71, 06, cf, 4a, e2, 0d, 9e, 95, c4, 1b, 3d, 2b, 88, 36, 7a, 57, 10, 6c, f4, ae, 20, d9, e9, 5c, 41, b3, d2, b8, 83, 67, a5, 71, 06, cf, 4a, e2, 0d, 9e, 95, c4, 1b, 3d, 2b, 88, 36, 7a, 57, 10, 6c, f4, ae, 20, d9, e9, 5c, 41, b3, d2, b8, 83, 67, a5, 71, 06, cf, 4a, e2, 0d, 9e, 95, c4, 1b, 3d, 2b, 88, 36, 7a, 57.

In a second embodiment, the preamble sequence is a byte stream of hexadecimal coded numbers in accordance with:

61, 92, fa, d3, b1, c0, 3e, 30, 4d, dc, c5, 12, 7e, 72, 1d, 0a, a0, 5d, 48, f0, 8b, 2d, bf, bd, af, 29, 9a, b0, c9, 7d, 69, d8, e0, 1f, 18, 26, ee, 62, 89, 3f, 39, 0e, 85, 50, 2e, a4, 78, 45, 96, df, de, d7, 94, cd, 58, 64, be, b4, ec, 70, 0f, 8c, 13, 77, 31, 44, 9f, 9c, 87, 42, a8, 17, 52, 3c, 22, cb, 6f, ef, 6b, ca, 66, ac, 32, 5f.

Another aspect of the invention relates to a method of writing a track on to a storage medium comprising writing a preamble sequence and user data onto the track. The user data and preamble data are written so they are close to each other on the track such that when a transducer reads the track it reads the preamble sequence immediately before it reads the user data. The preamble sequence is such that when the track is read by the transducer the preamble sequence has a power sequence with a power spectrum substantially equivalent to the power spectrum of the user data.

Preferably the medium is a magnetic tape on which plural diagonal tracks are written.

The preamble sequences are preferably the two previously set forth hexadecimal coded number sequences.

A further aspect of the invention relates to an apparatus for performing the previously discussed method of writing a track on a storage mechanism. The medium is preferably a magnetic tape on which a plurality of the tracks are diagonally written.

The above and still further objects, features and advantages of the present invention will become apparent upon consideration of the following detailed description of specific embodiments thereof, especially when taken in conjunction with the accompanying drawings.

DETAILED DESCRIPTION OF THE DRAWING

The constant frequency tones used in the preamble field of the known DDS-4 format devices have a spectral power content that differs from that of the user data in the data field. This is because the known preamble frequency tone comprises a sequence of bits +,+,−,−,+,+,−,− and so on in the preamble region. Such a sequence has a fairly narrow power spectrum centered around a narrow frequency band.

However, in general the user data in the data field has a power spectrum corresponding to a substantially random bit sequence, whereas the known constant frequency tone used in the preamble field of the DDS-4 format, has a different spectral power characteristic. Within the user data field, the user data is coded such that it appears random-like in nature. The minimum transition spacing physically recorded on the tape is of the order of 1 T, and data in the user data area has spacings between transitions typically of 1 T, 2T, 3T, 4T exclusively.

In the read channel of a prior art DDS-4 device, the automatic gain control system has an effective frequency response which causes it to respond to the received channel amplitude of a constant tone that differs from the response of the received channel amplitude of a pseudo random sequence of bits as present in the user data field, even though the actual amplitude of bits in those fields is the same. This causes the automatic gain control system to adjust the gain of the received channel, when in fact no effective change in received amplitude of individual bits has occurred. The adjustment is typically of the order 0.8 to 1.2 dB, with DDS-1 to DDS-3 gain control systems, and in a DDS-4 system, having a sample derived gain control system, the adjustment is typically 0.5 dB. Thus, the prior art DDS-4 read channel frequently does not have an optimal gain for receiving bits of user data, when it starts to read each user data field. The prior art gain control systems attempt to make a change in channel gain when experiencing a transition from the prior art preamble data to the prior art user data when in fact the amplitude of the bits of those data remains constant.

Changes in gain cause problems in the read channel at the sequence detector, which is usually a Viterbi detector. Threshold levels in the detector, set at +2, 0 or −2, determine whether the sampled signals read from the tape are in one of three bands, designated +2, 0, −2. If the amplitude of the signal supplied to the sequence detector changes, there is a change in the level of the signal relative to the threshold levels, to increase the rate at which errors are introduced in the levels of the read bits.

To avoid these problems, the preamble region 702 used to acquire gain and timing information by a read channel includes a data sequence having the property that it is treated by an automatic gain control system of the read channel, in almost the same way the automatic gain control system would treat a block of encoded user data in a user data field. The data sequence is preferably in accordance with FIG. 8A (in accordance with the co-pending application) or FIG. 8B (in accordance with the present application). Thus, in response to a transition from the preamble field to the user data field, the automatic gain control system maintains a stable pulse amplitude of bits entering the sequence detector.

This result is achieved by using a byte sequence having power spectrum properties similar to a block of encoded user data. Over a large amount of user data, the user data on average has a power spectrum equivalent to that of random data. However, the preamble data cannot be truly random, since it contains information enabling a synchronizer to lock onto it. The preamble data sequence must also have properties which allow a synchronization detector to synchronize quickly within a few T cycles to the preamble sequence. Several byte sequences are suitable for such a preamble data sequence. The byte sequences illustrated in FIGS. 8A and 8B have very good properties.

Figure 8A:
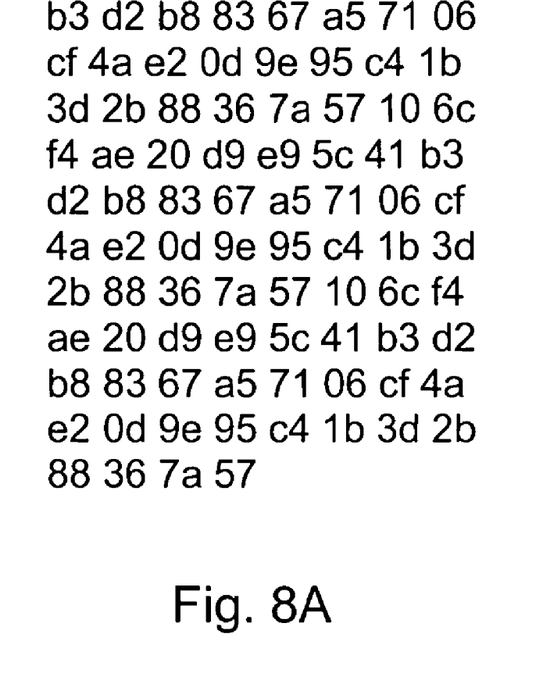
FIG. 8A is a schematic illustration of a specific example of a byte sequence applied to a preamble region of a logical write track according to a specific embodiment of the co-pending application.
Figure 8B:
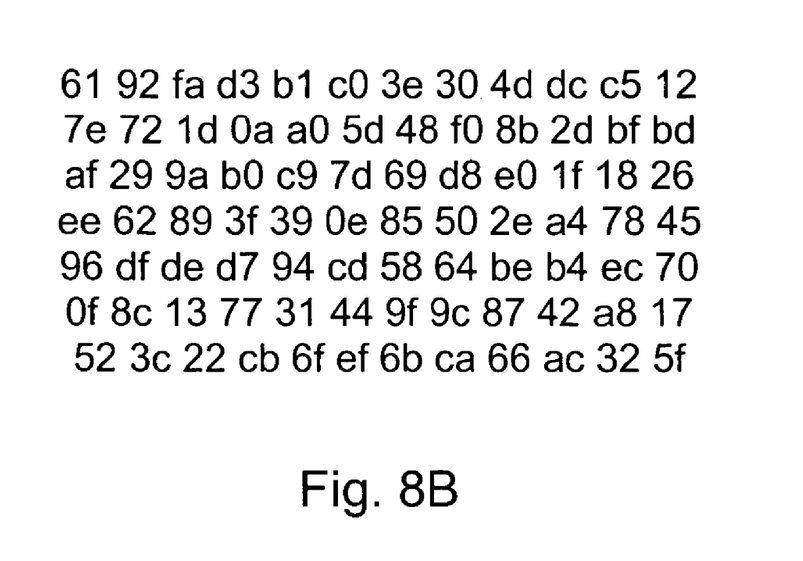
FIG. 8B is a schematic illustration of a specific example of a byte sequence applied to a preamble region of a logical write track according to a specific embodiment of the present invention.
Figure 9:
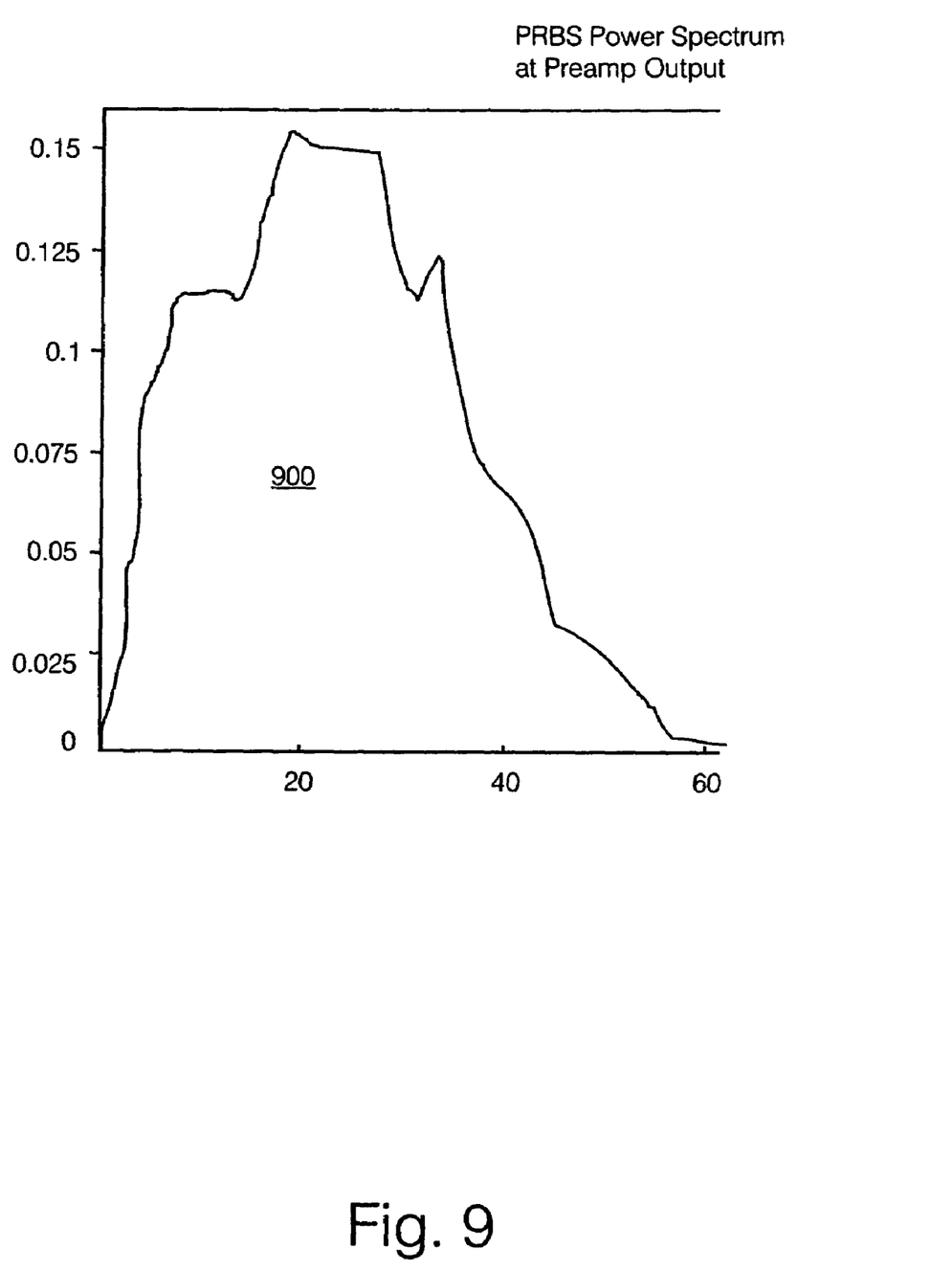
FIG. 9 is a plot of a power spectrum of a preamble signal having a byte sequence as illustrated in FIGS. 8A and 8B herein, the power spectrum taken at a preamplifier output stage of the read channel.

The byte sequences illustrated in FIGS. 8A and 8B are selected so they have power spectrums which closely match the power spectrum of an average, or typical, sequence of user data bytes in the user data region 703. The byte sequence of FIG. 8A or FIG. 8B passes through an 8-10 encoder prior to writing to tape. The preamble sequences of FIGS. 8A and 8B have bit wave lengths, T, as recorded on tape data storage medium, of 125 nm, resulting in a total preamble region of 854 bits over a distance of 107 μm. This is the same physical length across the tape as the prior art DDS-4 640 bit preamble sequence. This length is dictated by the physical properties of contact of a read or write head with the tape. The read or write heads are linearly in physical contact with the tape for only a finite distance on either side of a center line 607 of the tape. It is to be appreciated that the bit wavelength can differ from 107 μm without departing from the scope of the invention. While bit lengths in the range 100 nm to 140 nm are suitable for current technology, other bit lengths can be used. The particular byte sequences illustrated in FIGS. 8A and 8B have the following advantages:

Firstly, using the byte sequences as a preamble sequence, the spectrum of a received preamble signal at the preamplifier output of the read channel has no significant spectral holes in it. That is to say, there are no significant frequencies within the power spectrum of the output of the preamplifier, when reading the byte sequences of FIG. 8A or FIG. 8B, which are absent or low. Referring to FIG. 9 herein, there is illustrated a power spectrum 900 of a signal produced at the output of preamplifier 502 in the read channel when reading a preamble field 702 containing a byte sequence as illustrated in FIG. 8A. The power spectrum for the byte sequence of FIG. 8B is very similar to that of FIG. 9. In the power spectrum of FIG. 9, the distribution of power is centered around a mean value, and rolls off on opposite sides of the mean value without any significant power troughs; the roll off is over a range of frequencies between −6 dB points on opposite sides of the peak value. The automatic gain control circuit reacts differently to the spectrum of a 2T constant tone from the way it reacts to the spectrum of random data. The presence of intersymbol interference in random data tends to make the average magnitude of a received +2 or −2 signal slightly smaller than it should be, by up to 1 dB. This causes automatic gain control circuit to make a small gain adjustment on reception of the first data fragment, even though there is no change in the amplitude of the bits of the incoming signal.

In prior art DDS-4 products, since the behavior of the automatic gain control circuit is known after detection of a 2T preamble, the prior art preamble detector in conjunction with a prior art data recovery state machine is programmed such that as the break between preamble and random data in a user field is detected, a target level of the automatic gain control circuit system is immediately changed by a programmable amount in anticipation of a perceived change in incoming amplitude of user data. However as the number of bits of data in a single track increases, due to increasing bit density for the purpose of increasing the overall data storage capacity of a cassette tape, the prior art data recovery state machine is no longer capable of reliably spotting the boundary between the preamble data and the (random) user data. A chip containing the data recovery state machine must be operated in a non-optimal mode and is therefore susceptible to changes in perceived incoming signal amplitude. The result is that the inherent mismatch between the power spectrum of the prior art 2T preamble data field and the (random-like) user data field becomes more of a problem as data storage densities increase, and can prevent detection of the start of the user data field after detection of the preamble data.

In the write channel, the user data are encoded using an 8-10 modulation encoder. The coding used in the 8-10 modulation has its own power spectrum characteristics. Over a large amount of user data, the user data have a random-like nature and a power spectrum characteristic corresponding substantially to a random bit sequence. The codes of FIGS. 8A and 8B, when used in the preamble region, have power spectra that are substantially the same as a power spectrum of an 8-10 modulation code power spectrum convolved with a power spectrum of a truly random bit sequence.

Secondly, an even distribution of valid phase information is produced in the byte sequences of FIGS. 8A and 8B. It is important to have a sufficient number of valid transitions to allow a phase detector to maintain lock, or acquire lock under conditions of maximum noise. The preamble data sequence has a number of transitions which can be used for timing recovery. Only some of those transitions are useable by a timing circuit to acquire or maintain lock. Not all valid bit transitions contain phase information usable by a timing recovery loop circuit. Optimally, valid transitions occur throughout the preamble region, so that lock can be acquired and/or maintained anywhere in the preamble data sequence. However, some prior art preamble byte patterns have valid phase information concentrated at either the beginning or the end of the pattern, although most prior art preamble byte patterns contain about the same amount of usable phase information overall. The byte sequences illustrated in FIGS. 8A and 8B have relatively even distributions of valid phase information throughout each entire byte sequence.

Figure 10:
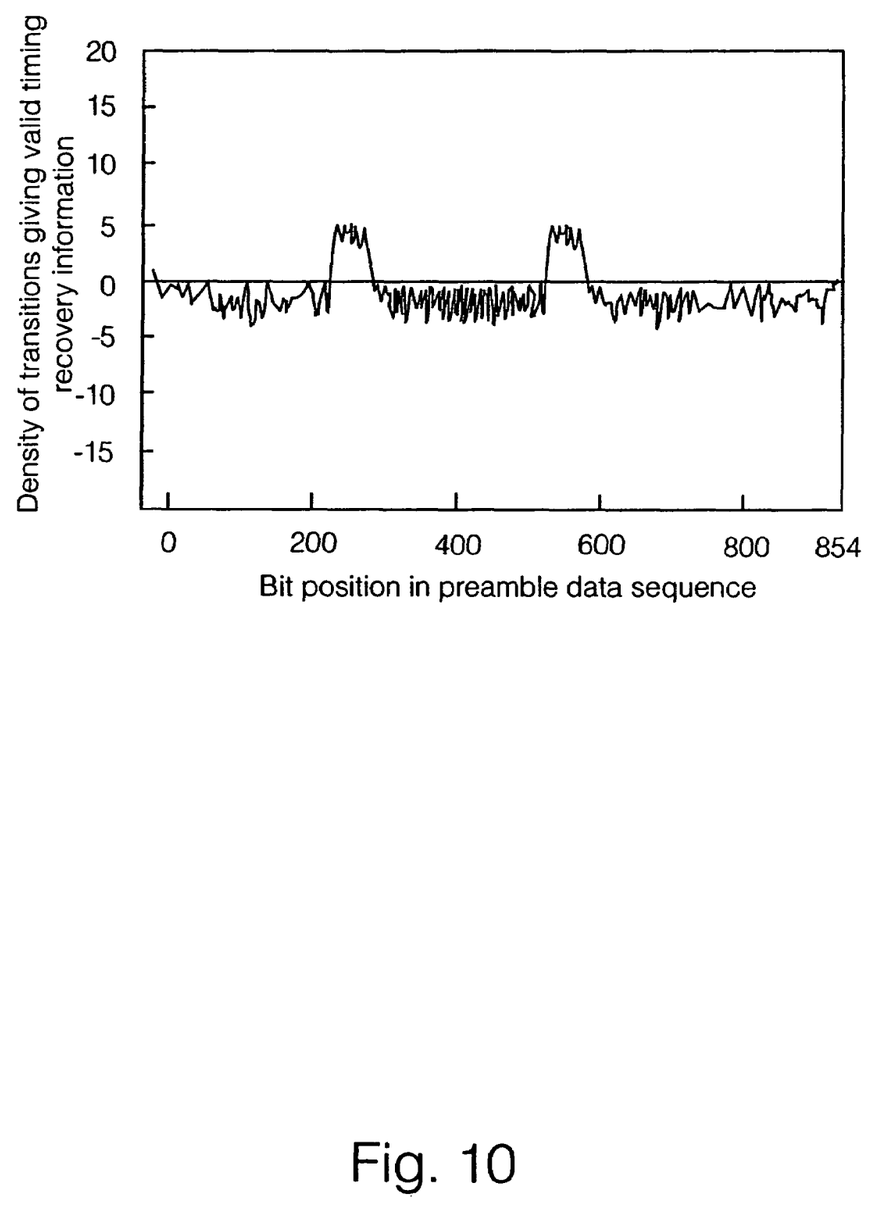
FIG. 10 is a plot of the distribution of transitions which give valid phase information in the byte sequence as illustrated in FIGS. 8A and 8B herein.

FIG. 10 is a plot of rolling deviation of a summed number of valid transitions from a summed average number of valid transitions per bit plotted against bit position within the preamble byte sequence in the preamble data region 702. An ideal byte sequence has an even distribution of transitions containing valid phase information, distributed between the first and last bytes of the preamble data sequence. Each end of the graph is therefore constrained to be '0'. The byte sequences of FIGS. 8A and 8B give rise to the transition distribution diagram of FIG. 10, having a relatively constant distribution of transitions with valid phase information. The transitions are relatively evenly distributed from bytes 0 to 853 of the preamble byte sequence, with only small peaks of density of transitions having valid phase information, constrained within ±6 transitions on opposite sides of a center value. In contrast, in prior art preamble byte sequence patterns, some patterns have a peak deviation from a mean exceeding ±20 transitions on opposite sides of the peak.

Thirdly, the last eight bits of the preamble byte sequences of FIGS. 8A and 8B correspond to a 2T pattern. That is to say, a pattern of 1 0 1 0 1 0 1 0 1 0, results in a write current of 1,1,−1,−1,1,1,−1,−1,1,1; otherwise known as 2T. The 1 0 1 0 1 0 1 0 1 0 pattern appears to have the lowest possible intersymbol interference noise on entry into a first synchronization sequence 704 at the start of user data region 703, and therefore an enhanced probability of recovering the first synchronization sequence 704 in the user data region.

Figure 11:
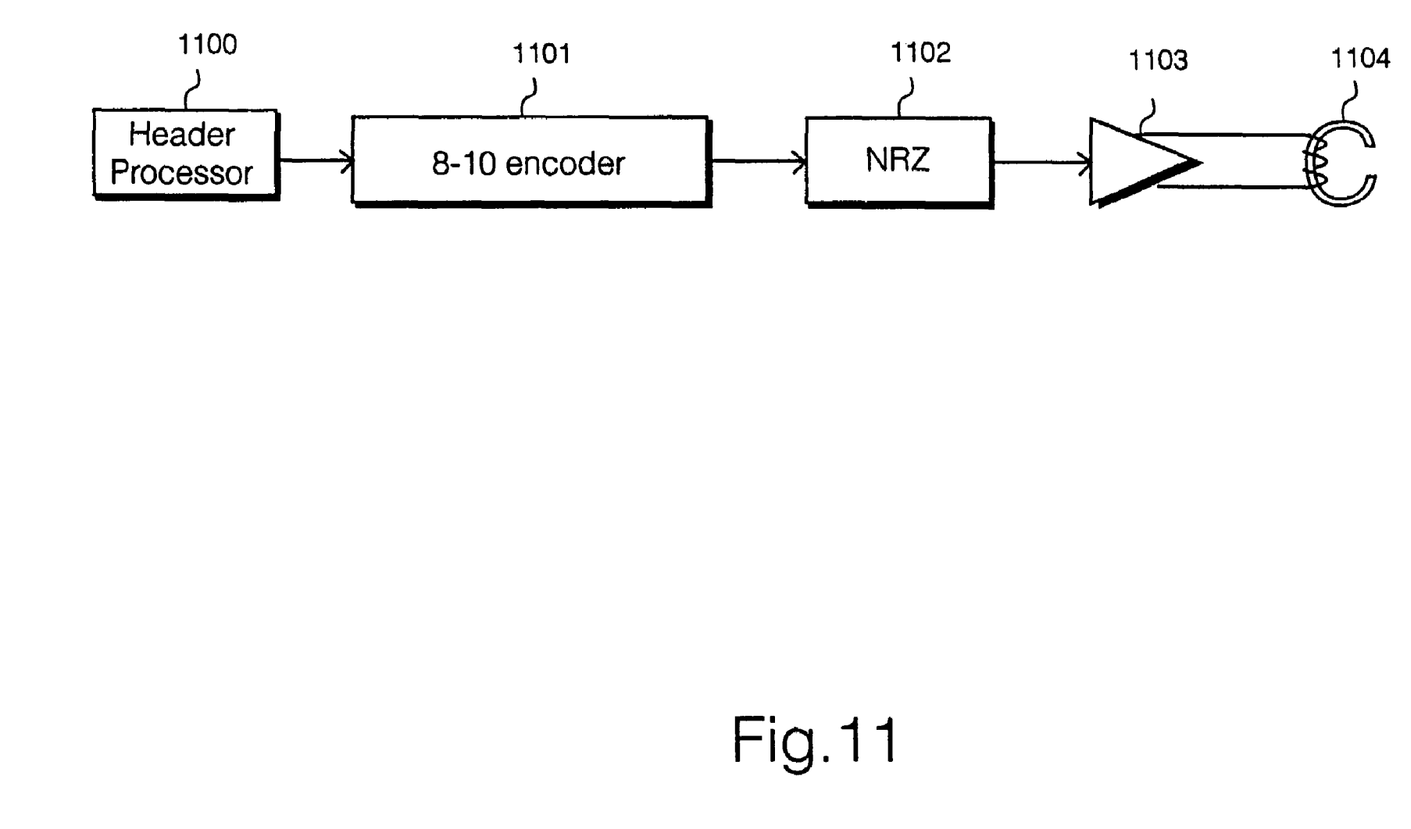
FIG. 11 is a schematic diagram of a write signal channel for writing data to a magnetic tape according to the specific embodiment of the present invention.

Referring to FIG. 11 herein, there is illustrated schematically elements of a write channel for writing data to a magnetic tape data storage medium, according to a specific embodiment of the present invention. The write channel comprises a header processor 1100 for producing header data, including a preamble region that precedes a user data region; an 8-10 encoder 1101 for encoding header data, including the preamble data and for encoding the user data, prior to recording onto tape; a non-return to zero circuit 1102; an output amplifier 1103 for outputting a signal to a write head 1104, which writes data to a magnetic tape data storage medium as a plurality of pulses, striped in a direction across a magnetic tape as in the prior art DDS-4 format. The header processor 1100 comprises a preamble field generator for generating preamble data according to the byte sequence illustrated with reference to FIG. 8A or 8B. The preamble generator can be (1) a feedback shift register arrangement, (2) included in an application specific integrated circuit (ASIC), or (3) part of a processor driven by software.

Figure 12:
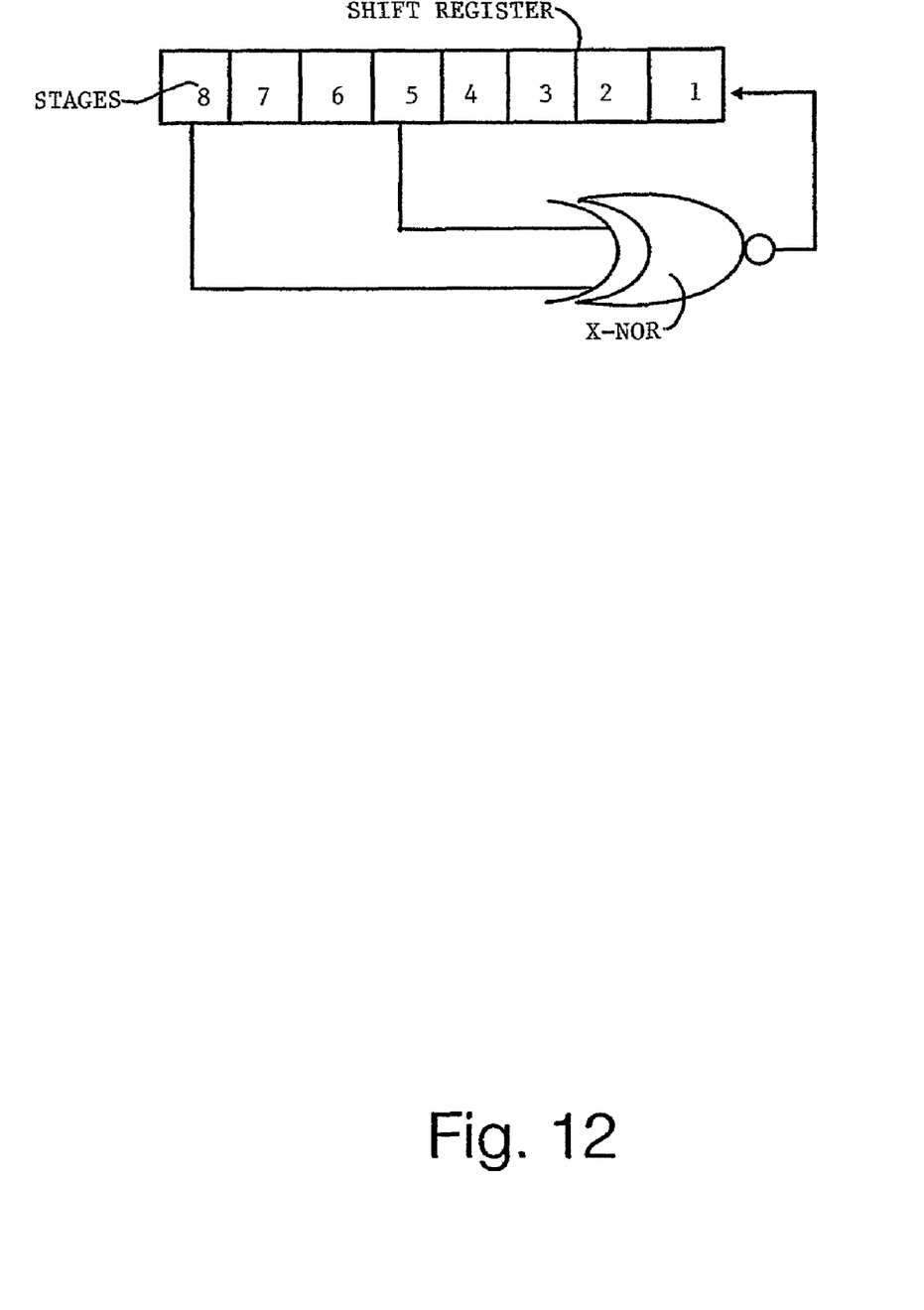
FIG. 12 is a schematic diagram of a shift register arrangement according to a specific embodiment of the present invention, for generating a byte sequence as illustrated in FIGS. 8A and 8B.

Referring to FIG. 12 herein, there is illustrated schematically one embodiment of a linear feedback shift register circuit capable of generating the pseudo random bit sequences illustrated in FIGS. 8A and 8B. The shift register comprises an eight stage shift register having an exclusive NOR gate (X-NOR) connected to be responsive to the output bits of the fifth and eighth stages of the register that respectively correspond to bits four and seven. The gate has an output that is fed back (i.e. supplied) to the first stage of the register, corresponding with bit zero. For the sequence of FIG. 8A, values 10000010 are respectively initially loaded into the first, second, third, fourth, fifth, sixth, seventh and eighth stages of the register. For the sequence of FIG. 8B, bit values 10101100 are respectively initially loaded into the first, second, third, fourth, fifth, sixth, seventh and eighth stages of the register. The first output from the linear feedback shift register, taken after 8 clock cycles have been applied to the shift register, is an eight bit (i.e., hexadecimal) byte; for the sequence of FIG. 8A, the first byte has a hexadecimal value of b3; for the sequence of FIG. 8B, the first byte has a hexadecimal value of 61. Successive eight bit bytes, in hexadecimal code, as indicated by FIGS. 8A and 8B, are derived from the eight shift register stages in FIGS. 8A and 8B, after successive sets of eight clock cycles. The shift register is reset to the "read" value of 10000010 or 10101100 at the start of every track.

While there have been described and illustrated specific embodiments of the invention, it will be clear that variations in the details of the embodiment specifically illustrated and described may be made without departing from the true spirit and scope of the invention as defined in the appended claims.

The invention claimed is:

1. A method of encoding a plurality of tracks of data for storage on a tape data storage medium, said method comprising:
   sequentially writing the plurality of data tracks to said tape data storage medium so each of said tracks includes a preamble region and a user data region, said preamble region having a preamble byte stream of hexadecimal coded numbers in accordance with:
   b3, d2, b8, 83, 67, a5, 71, 06, cf, 4a, e2, 0d, 9e, 95, c4, 1b, 3d, 2b, 88, 36, 7a, 57,10, 6c, f4, ae, 20, d9, e9, 5c, 41, b3, d2, b8, 83, 67, a5, 71, 06, cf, 4a, e2, 0d, 9e, 95, c4, 1b, 3d, 2b, 88, 36, 7a, 57, 10, 6c, f4, ae, 20, d9, e9, 5c, 41, b3, d2, b8, 83, 67, a5, 71, 06, cf, 4a, e2, 0d, 9e, 95, c4, 1b, 3d, 2b, 88, 36, 7a, 57.

2. The method as claimed in claim 1, wherein said preamble data sequence comprises bits, which when written to tape each occupy a length of the order of 100 to 140 nanometers per bit in the direction of travel of the tape across a head.

3. The method as claimed in claim 1, wherein said plurality of data tracks are written across a width of said tape data storage medium in a direction transverse to forward movement of said tape.

4. A method of encoding a plurality of tracks of data for storage on a tape data storage medium, said method comprising:
   sequentially writing the plurality of data tracks to said tape data storage medium so each of said tracks includes a preamble region and a user data region, said preamble region having a preamble byte stream of hexadecimal coded numbers in accordance with:
   61, 92, fa, d3, b1, c0, 3e, 30, 4d, dc, c5, 12, 7e, 72, 1d, 0a, a0, 5d, 48, f0, 8b, 2d, bf, bd, af, 29, 9a, b0, c9, 7d, 69, d8, e0, 1f, 18, 26, ee, 62, 89, 3f, 39, 0e, 85, 50, 2e, a4, 78, 45, 96, df, de, d7, 94, cd, 58, 64, be, b4, ec, 70, 0f, 8c, 13, 77, 31, 44, 9f, 9c, 87, 42, a8, 17, 52, 3c, 22, cb, 6f, ef, 6b, ca, 66, ac, 32, 5f.

5. The method as claimed in claim 4, wherein said preamble data sequence comprises bits, which when written to tape each occupy a length of the order of 100 to 140 nanometers per bit in the direction of travel of the tape across a head.

6. The method as claimed in claim 4, wherein said plurality of data tracks are written across a width of said tape data storage medium in a direction transverse to forward movement of said tape.

7. A method of reading a stream of preamble and information bytes in hexadecimal coded numbers from a tape data storage medium, said method comprising the steps of:
   reading a preamble comprising a preamble byte stream of hexadecimal coded numbers in accordance with:
   b3, d2, b8, 83, 67, a5, 71, 06, cf, 4a, e2, 0d, 9e, 95, c4, 1b, 3d, 2b, 88, 36, 7a, 57, 10, 6c, f4, ae, 20, d9, e9, 5c, 41, b3, d2, b8, 83, 67, a5, 71, 06, cf, 4a, e2, 0d, 9e, 95, c4, 1b, 3d, 2b, 88, 36, 7a, 57, 10, 6c, f4, ae, 20, d9, e9, 5c, 41, b3, d2, b8, 83, 67, a5, 71, 06, cf, 4a, e2, 0d, 9e, 95, c4, 1b, 3d, 2b, 88, 36, 7a, 57, and synchronising the read preamble bytes and the read information bytes.

8. A method of reading a stream of preamble and information bytes in hexadecimal coded numbers from a tape data storage medium, said method comprising the steps of:
   reading a preamble comprising a preamble byte stream of hexadecimal coded numbers in accordance with:
   61, 92, fa, d3, b1, c0, 3e, 30, 4d, dc, c5, 12, 7e, 72, 1d, 0a, a0, 5d, 48, f0, 8b, 2d, bf, bd, af, 29, 9a, b0, c9, 7d, 69, d8, e0, 1f, 18, 26, ee, 62, 89, 3f, 39, 0e, 85, 50, 2e, a4, 78, 45, 96, df, de, d7, 94, cd, 58, 64, be, b4, ec, 70, 0f, 8c, 13, 77, 31, 44, 9f, 9c, 87, 42, a8, 17, 52, 3c, 22, cb, 6f, ef, 6b, ca, 66, ac, 32, 5f, and synchronising the read preamble bytes and the read information bytes.

9. In combination, an encoder device for encoding a plurality of tracks of data for storage on a tape data storage medium, and a write device for storing the plural encoded tracks on the tape data storage medium, said encoder device comprising a byte stream generator for generating the byte stream claimed in claim 1.

10. In combination, an encoder device for encoding a plurality of tracks of data for storage on a tape data storage medium, and a write device for storing the plural encoded tracks on the tape data storage medium, said encoder device comprising a byte stream generator for generating the byte stream claimed in claim 4.

11. An apparatus for encoding a plurality of tracks of data for storage on a tape data storage medium, said apparatus comprising:
   a write circuit for sequentially writing said plurality of data tracks to a tape data storage medium, said write circuit arranged for sequentially writing on each of said data tracks, a preamble region which precedes a user data region, said preamble region having a preamble byte stream of hexadecimal coded numbers in accordance with:
   b3, d2, b8, 83, 67, a5, 71, 06, cf, 4a, e2, 0d, 9e, 95, c4, 1b, 3d, 2b, 88, 36, 7a, 57, 10, 6c, f4, ae, 20, d9, e9, 5c, 41, b3, d2, b8, 83, 67, a5, 71, 06, cf, 4a, e2, 0d, 9e, 95, c4, 1b, 3d, 2b, 88, 36, 7a, 57, 10, 6c, f4, ae, 20, d9, e9, 5c, 41, b3, d2, b8, 83, 67, a5, 71, 06, cf, 4a, e2, 0d, 9e, 95, c4, 1b, 3d, 2b, 88, 36, 7a, 57.

12. The apparatus of claim 11, wherein said write circuit is arranged to write bits of data to said tape, wherein each said bit occupies a length in the direction of tape travel past a head of the order 100 to 140 nanometers.

13. The apparatus of claim 12, comprising an 8-10 encoder for encoding said preamble data sequence for deriving an 8-10 encoded preamble data sequence having a power spectrum substantially similar to a power spectrum of an 8-10 coding convolved with a power spectrum of a substantially random data.

14. An apparatus for encoding a plurality of tracks of data for storage on a tape data storage medium, said apparatus comprising:
   a write circuit for sequentially writing said plurality of data tracks to a tape data storage medium, said write circuit arranged for sequentially writing on each of said data tracks, a preamble region which precedes a user data region, said preamble region having a preamble byte stream of hexadecimal coded numbers in accordance with:
   61, 92, fa, d3, b1, c0, 3e, 30, 4d, dc, c5, 12, 7e, 72, 1d, 0a, a0, 5d, 48, f0, 8b, 2d, bf, bd, af, 29, 9a, b0, c9, 7d, 69, d8, e0, 1f, 18, 26, ee, 62, 89, 3f, 39, 0e, 85, 50, 2e, a4, 78, 45, 96, df, de, d7, 94, cd, 58, 64, be, b4, ec, 70, 0f, 8c, 13, 77, 31, 44, 9f, 9c, 87, 42, a8, 17, 52, 3c, 22, cb, 6f, ef, 6b, ca, 66, ac, 32, 5f.

15. The apparatus of claim 14, wherein said write circuit is arranged to write bits of data to said tape, wherein each said bit occupies a length in the direction of tape travel past a head of the order 100 to 140 nanometers.

16. The apparatus of claim 15, comprising an 8-10 encoder for encoding said preamble data sequence for deriving an 8-10 encoded preamble data sequence having a power spectrum substantially similar to a power spectrum of an 8-10 coding convolved with a power spectrum of a substantially random data.

17. In combination,
   a data storage medium storing a preamble sequence and user data, and
   a transducer for sequentially reading the preamble sequence and user data, said preamble sequence comprising a data stream having a power spectrum equivalent to a power spectrum of the user data.

18. The combination of claim 17 wherein the preamble sequence is the following byte stream of hexadecimal coded numbers:
   61, 92, fa, d3, b1, c0, 3e, 30, 4d, dc, c5, 12, 7e, 72, 1d, 0a, a0, 5d, 48, f0, 8b, 2d, bf, bd, af, 29, 9a, b0, c9, 7d, 69, d8, e0, 1f, 18, 26, ee, 62, 89, 3f, 39, 0e, 85, 50, 2e, a4, 78, 45, 96, df, de, d7, 94, cd, 58, 64, be, b4, ec, 70, 0f, 8c, 13, 77, 31, 44, 9f, 9c, 87, 42, a8, 17, 52, 3c, 22, cb, 6f, ef, 6b, ca, 66, ac, 32, 5f.

19. The combination of claim 17 wherein the medium is magnetic.

20. The combination of claim 17 wherein the medium is magnetic tape.

21. An apparatus for reading and writing a data sequence, said data sequence comprising:
   a preamble data region and;
   a user data region;
   wherein said preamble data region comprises a byte stream having a power spectrum substantially similar to a power spectrum of said user data in said user data region, said byte stream comprising a byte stream having the following byte stream of hexadecimal coded numbers:
   61, 92, fa, d3, b1, c0, 3e, 30, 4d, dc, c5, 12, 7e, 72, 1d, 0a, a0, 5d, 48, f0, 8b, 2d, bf, bd, af, 29, 9a, b0, c9, 7d, 69, d8, e0, 1f, 18, 26, ee, 62, 89, 3f, 39, 0e, 85, 50, 2e, a4, 78, 45, 96, df, de, d7, 94, cd, 58, 64, be, b4, ec, 70, 0f, 8c, 13, 77, 31, 44, 9f, 9c, 87, 42, a8, 17, 52, 3c, 22, cb, 6f, ef, 6b, ca, 66, ac, 32, 5f.

22. An encoder device for encoding a track of data for storage on a data storage medium, said encoder device comprising a byte stream generator for encoding a track for recording on a data storage medium so said recorded track includes a preamble region which precedes a user data region, said preamble region having a preamble data sequence comprising the following byte stream of hexadecimal coded numbers:
   61, 92, fa, d3, b1, c0, 3e, 30, 4d, dc, c5, 12, 7e, 72, 1d, 0a, a0, 5d, 48, f0, 8b, 2d, bf, bd, af, 29, 9a, b0, c9, 7d, 69, d8, e0, 1f, 18, 26, ee, 62, 89, 3f, 39, 0e, 85, 50, 2e, a4, 78, 45, 96, df, de, d7, 94, cd, 58, 64, be, b4, ec, 70, 0f, 8c, 13, 77, 31, 44, 9f, 9c, 87, 42, a8, 17, 52, 3c, 22, cb, 6f, ef, 6b, ca, 66, ac, 32, 5f.

23. A storage medium including a track having a preamble portion and a data portion, the preamble portion comprising the following byte stream of hexadecimal coded numbers;
   61, 92, fa, d3, b1, c0, 3e, 30, 4d, dc, c5, 12, 7e, 72, 1d, 0a, a0, 5d, 48, f0, 8b, 2d, bf, bd, af, 29, 9a, b0, c9, 7d, 69, d8, e0, 1f, 18, 26, ee, 62, 89, 3f, 39, 0e, 85, 50, 2e, a4, 78, 45, 96, df, de, d7, 94, cd, 58, 64, be, b4, ec, 70, 0f, 8c, 13, 77, 31, 44, 9f, 9c, 87, 42, a8, 17, 52, 3c, 22, cb, 6f, ef, 6b, ca, 66, ac, 32, 5f.

24. The storage medium of claim 23 wherein the medium is magnetic.

25. The storage medium of claim 23 wherein the medium is magnetic tape.

26. The storage medium of claim 25 wherein the magnetic tape includes a plurality of the tracks.

27. The data storage medium of claim 26, wherein the tracks are diagonal.

28. A data storage medium comprising a track storing a preamble sequence close to user data such that a transducer for reading the track reads the preamble sequence immediately before reading the user data; the preamble sequence being such that when the track is read by the transducer the preamble sequence has a power sequence with a power spectrum substantially equivalent to the power spectrum of the user data.

29. The storage medium of claim 28 wherein the medium is magnetic.

30. The storage medium of claim 28 wherein the medium is magnetic tape.

31. The storage medium of claim 30 wherein the magnetic tape includes a plurality of the tracks.

32. The storage medium of claim 31 wherein the tracks are diagonal.

33. The data storage medium of claim 28 in combination with the transducer.

34. The combination of claim 33 further including an automatic gain control circuit connected to be responsive to the transducer.

35. A method of writing a track on to a storage medium comprising writing a preamble sequence onto the track, writing user data onto the track, the user data and preamble data being written so they are close to each other on the track such that when a transducer reads the track it reads the preamble sequence immediately before it reads the user data; the preamble sequence being such that when the track is read by the transducer the preamble sequence has a power sequence with a power spectrum substantially equivalent to the power spectrum of the user data.

36. The method of claim 35 further comprising writing a plurality of said tracks on the medium.

37. The method of claim 36 wherein the medium is magnetic tape and the tracks are written diagonally.

38. Apparatus for performing the method of claim 35, the apparatus including a transducer arrangement for writing the track on the storage medium and a source for deriving the preamble sequence and the user data, the transducer arrangement being arranged to be responsive to the source arrangement; and the preamble sequence being such that when the track is read by the transducer the preamble sequence has a power sequence with a power spectrum substantially equivalent to the power spectrum of the user data.

* * * * *

UNITED STATES PATENT AND TRADEMARK OFFICE
CERTIFICATE OF CORRECTION

| | |
|---|---|
| PATENT NO. | : 7,359,132 B2 |
| APPLICATION NO. | : 10/754617 |
| DATED | : April 15, 2008 |
| INVENTOR(S) | : Robert Philip Morling et al. |

It is certified that error appears in the above-identified patent and that said Letters Patent is hereby corrected as shown below:

In column 3, line 44, delete "9se," and insert -- 9e, --, therefor.

In column 12, line 36, in Claim 27, delete "storagemedium" and insert -- storage medium --, therefor.

Signed and Sealed this

Twenty-ninth Day of July, 2008

JON W. DUDAS
*Director of the United States Patent and Trademark Office*